United States Patent [19]
Ozawa et al.

[11] Patent Number: 5,858,297
[45] Date of Patent: Jan. 12, 1999

[54] METHOD AND APPARATUS OF CORRECTING SUPERFLUOUS CURING THICKNESS OF OPTICAL MODELING PRODUCT

[75] Inventors: Masahiko Ozawa, Yokohama; Norio Goto, Tokyo; Masumi Moritani, Yokohama; Masakatsu Ohkubo, Shimotsuga-gun; Toshiroo Endoo, Yokohama, all of Japan

[73] Assignee: Hitachi, Ltd., Tokyo, Japan

[21] Appl. No.: 637,623

[22] PCT Filed: Nov. 1, 1994

[86] PCT No.: PCT/JP94/01841

§ 371 Date: Apr. 29, 1996

§ 102(e) Date: Apr. 29, 1996

[87] PCT Pub. No.: WO95/12485

PCT Pub. Date: May 11, 1995

[30] Foreign Application Priority Data

Nov. 2, 1993 [JP] Japan .................................. 5-274041
Nov. 5, 1993 [JP] Japan .................................. 5-276475
Apr. 6, 1994 [JP] Japan .................................. 6-068310

[51] Int. Cl.$^6$ ............................ B29C 35/08; B29C 41/02
[52] U.S. Cl. ........................ 264/401; 264/40.1; 264/308; 364/468.27; 395/119; 395/120; 395/141; 395/142; 425/174.4
[58] Field of Search .................................. 264/40.1, 308, 264/401; 425/174.4; 364/468.27; 395/119, 120, 141, 142

[56] References Cited

U.S. PATENT DOCUMENTS 5,238,639 8/1993 Vinson et al. ........................... 264/401

FOREIGN PATENT DOCUMENTS

| | | |
|---|---|---|
| 277 832 A2 | 8/1988 | European Pat. Off. . |
| 422 234 A1 | 4/1991 | European Pat. Off. . |
| 4-138245 | 5/1992 | Japan . |
| 4-169221 | 6/1992 | Japan . |
| 4-79825 | 12/1992 | Japan . |
| 4-79827 | 12/1992 | Japan . |
| 5-33900 | 5/1993 | Japan . |
| 5-33901 | 5/1993 | Japan . |
| 5-224721 | 9/1993 | Japan . |
| 5-278124 | 10/1993 | Japan . |
| WO 91/12120 | 8/1991 | WIPO . |

OTHER PUBLICATIONS

Maruya et al. "Optical Modeling Method" Nikkan Kogyo Shinbunsha (1990), pp. 2–3.
"RP & M. SLA Special Seminar" Sponsored by 3D Systems Japan, Oct. 29–30, 1992 (no pages given).

*Primary Examiner*—Leo B. Tentoni
*Attorney, Agent, or Firm*—Antonelli, Terry, Stout & Kraus, LLP

[57] ABSTRACT

According to the present invention, in optical modeling method and apparatus of preparing a cubic resin model by curing ultraviolet-ray curable resin under irradiation of a laser beam thereon, for the sake of automatically correcting a dimensional difference caused by superfluous curing due to a transmitting laser beam by automatically detecting the bottom of an overhang portion or a modeling product on surface shape data, the dimensional difference is corrected automatically on the surface shape data through a method in which vertexes of polygonal patches constituting the surface shape data are replaced with nodes, nodes constituting a polygonal patch lying at the overhang portion bottom are moved by a correction amount obtained from a value conforming to an inclination of the patch plane to change the shape and position, and modeling is carried out on the basis of the data.

10 Claims, 17 Drawing Sheets

DESIGN VALUE

CORRECTED MODEL

OPTICAL MODELING PRODUCT OF CORRECTED MODEL

DESIGN VALUE

CORRECTED MODEL

OPTICAL MODELING PRODUCT OF CORRECTED MODEL

DESIGN VALUE CONTOUR LINES

OPTICAL MODELING PRODUCT

CORRECTED MODEL

OPTICAL MODELING PRODUCT OF CORRECTED MODEL

CORRECTION DIRECTION

CORRECTION DIRECTION

RELATION BETWEEN LAMINATION THICKNESS
AND DIMENSIONAL DIFFERENCE

SURFACE SHAPE
CORRECTION DATA

OPTICAL MODELING
MODEL

SURFACE SHAPE
CORRECTION DATA

OPTICAL MODELING
MODEL

FIG. 16
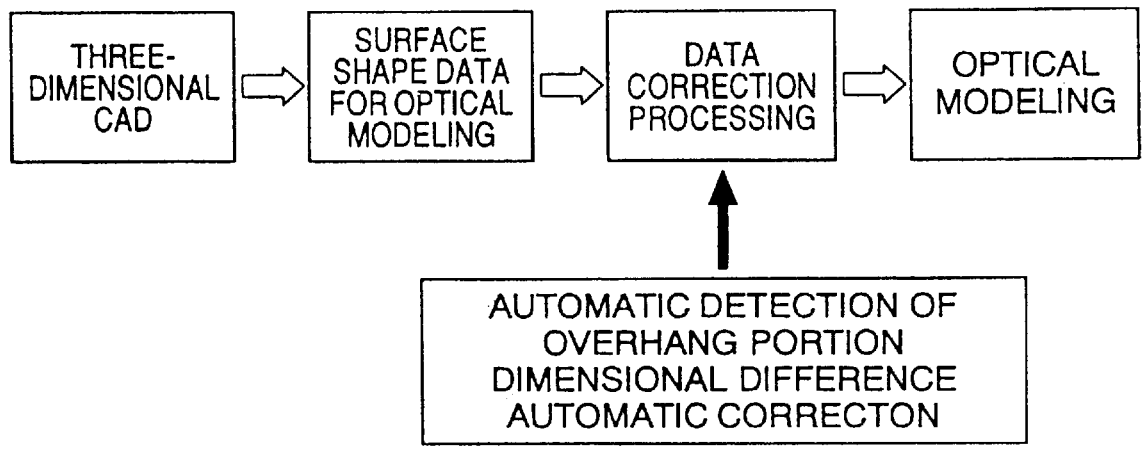
FIG. 17(a)    FIG. 17(b)
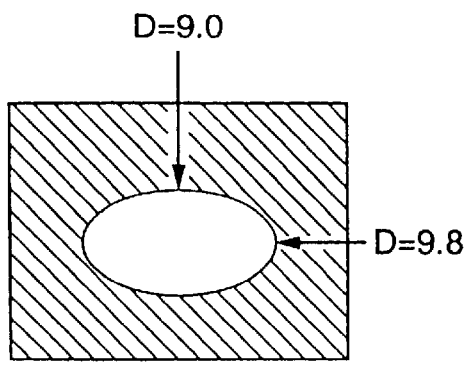
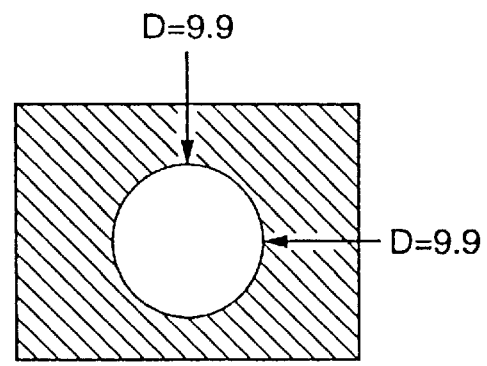
WITHOUT
CORRECTION
AFTER
CORRECTION
(DESIGN VALUE D = 10.0)

METHOD AND APPARATUS OF CORRECTING SUPERFLUOUS CURING THICKNESS OF OPTICAL MODELING PRODUCT

DESCRIPTION

1. Technical Field

The present invention relates to optical modeling method and apparatus of preparing a cubic resin model by curing ultraviolet-ray curable resin under irradiation of a laser beam and more particularly, to method and apparatus for providing an optical modeling product of high dimensional accuracy by correcting a superfluous curing thickness due to a transmitting laser beam.

2. Background Art

Conventionally, in connection with optical modeling method and apparatus, a method has been known in which three-dimensional shape model data is converted into contour line data and sectional shapes at respective contour lines are sequentially laminated to prepare a cubic model as described in "Optical Modeling Method" by Maruya et al, Nikkan Kogyo Shinbunsha.

Measures for improving accuracy are described in Japanese Patent Publication Nos. 4-79825, 4-79827, 5-33900 and 5-33901.

Also, "RP&M•SLA Special Seminar", sponsored by Japanese 3D System, Oct. 29–30, '92 describes that when a resin layer is subjected to laser irradiation by scanning a laser beam once or by intersecting laser beams, a curing depth at a laser beam intersecting portion is about 1.7 times as large as a curing depth at a scanned portion.

The aforementioned prior arts have failed to take into consideration correction of a superfluous curing thickness due to a transmitting laser beam at the bottom of an overhang portion. Consequently, at the bottom of that portion, fresh resin is cured by a transmitting laser beam and the thickness exceeds a design value, raising a problem that the dimensional accuracy is degraded.

Further, in order to match the dimension of a modeling product to a design value, a secondary working step such as shaving is needed but it is sometimes impossible for a narrow gap to be shaved and correction of a dimensional difference is needed.

A method of modifying the design dimension in three-dimensional CAD is also available as a method of correcting the dimensional difference but the dimensional modification in CAD is not easy and is time-consuming.

DISCLOSURE OF INVENTION

An object of the present invention is to solve the problems as above and to provide a method of automatically detecting the bottom of a modeling product or the bottom of an overhang portion and automatically correcting a dimensional difference inherent to (stereolithography).

To accomplish the above object, the dimensional difference is automatically corrected on surface shape data through a method in which vertex of polygonal patches constituting the surface shape data are replaced with nodes and nodes constituting a polygonal patch lying at the bottom of an overhang portion are moved to change the shape and position of that polygonal patch, and modeling is carried out based on those data.

To accomplish the above object, a superfluous curing thickness a at the bottom of an overhang portion is determined pursuant to the following equation (1), and the superfluous curing thickness $\alpha$ is precedently removed from a design value in a three-dimensional shape model and converted into contour line data.

Given that the number of laminated layers of modeling of an overhang portion is N, lamination pitch is P, light absorption coefficient of resin is k, wavelength of curing beam is $\lambda$ and the ratio of critical energy of resin curing to irradiation energy of a curing beam is Eo, a superfluous curing thickness $\alpha$ is determined for pre-correction of superfluous curing as below:

$$\alpha = -\lambda/k(ln(Eo) - ln(C)) - P \quad (1)$$

where $$C = (1-B^N)/(1-B)$$

$$B = EXP(-kP/\lambda).$$

By removing and adding the superfluous curing thickness $\alpha$ determined form the above equation (1) from and to contour line data, an optical modeling product of high dimensional accuracy can be obtained.

How to determine the superfluous curing thickness a will be described with reference to FIG. 5, FIG. 11 (a) and FIG. 11(b). Given that lamination pitch is P, depth to the top of a first curing layer is D, the number of laminated layers is N and light absorption coefficient of resin is k, transmitting beam energy En(D,N) at the depth D upon lamination of N layers is $En(D,N) = EXP(-k(D+(N-1)P)/\lambda)$. As the lamination proceeds, a transmitting beam is irradiated many times on a lower portion of the first layer and accumulative energy Etotal (D,N) thereat is $$\begin{aligned} Etotal(D,N) &= EXP(-kD/\lambda) \\ &+ EXP(-k(D+P)/\lambda) \\ &+ \\ &\quad \cdot \\ &\quad \cdot \\ &\quad \cdot \\ &+ EXP(-k(D+(n-1)P)/\lambda). \end{aligned}$$

By setting $$A = EXP(-kD/\lambda)$$

$$B = EXP(-kP/\lambda),$$

there results
$Etotal(D,N) = A(1+B+B^2+ \ldots +B^{(n-1)})$
By taking logarithm of both sides,
$ln(Etotal(D,N)) = -kD/\lambda + ln(C)$
results, where $c = (1-B^n)/(1-B)$.

Accordingly, because of $D = -\lambda/k(ln(Etotal(D,N)) - ln(C))$ being the depth to the top of the first layer and given that Etotal (D,N) is also critical curing power (ratio to irradiation power), the superfluous curing thickness a when N layers are laminated is $\alpha = D - P(n-1)$.

Further, to accomplish the above object, the direction of a normal vector of a patch plane of a polygonal patch constituting surface shape data is examined to decide whether an overhang exists, vertex constituting a patch are replaced with nodes so as to be put in order, the nodes are discriminated as to whether to be nodes constituting a polygonal patch lying at the bottom of an overhang portion, and when the nodes constitute the polygonal patch lying at the bottom of the overhang portion, these nodes are moved by a moving amount determined pursuant to a predetermined rule in accordance with an inclination of the patch plane to change the shape and position of the polygonal patch. At that time, when nodes are in common to a plurality of patches, the direction of a normal vector of a patch plane to be moved by a maximum of moving amounts determined by inclinations of respective patch planes is examined in order to know which direction that patch plane faces. If a Z axis component of the normal vector is negative, the patch plane faces downwards on the Z axis. Namely, when the Z axis direction is taken in the vertical direction, that patch is so discriminated as to lie at the overhang portion bottom. When vertexes constituting the patch are merely moved for correction in compliance with results of decision of the patch direction (normal vector), vertexes in common to a plurality of patches are sometimes moved by different amounts and the shape is disturbed. Therefore, vertexes of a polygonal patch are put in order in the form of nodes, these nodes are discriminated as to whether to lie at the overhang bottom by examining the direction of the patch through the aforementioned method and they are moved. Thereafter, by returning. the nodes to coordinates of vertexes of respective patches, correction can be carried out without disturbing the shape. The afore-mentioned dimensional difference is automatically corrected on surface shape data through the above-method and then modeling is performed on the basis of the data.

In the present invention, by replacing the superfluous curing thickness due to a transmitting laser beam on contour line data or removing it on a three-dimensional shape model design value, the dimensional accuracy of a modeling product can be improved.

Also, in the present invention, the dimensional difference inherent to optical modeling technique can be corrected automatically on surface shape data and the dimensional accuracy of an optical modeling product can be improved by performing modeling on the basis of surface shape data after correction. Further, since the aforementioned correction processing can be effected automatically, efficiency of the dimensional difference correction can be improved. In addition, such a secondary working step as shaving can be omitted.

BRIEF DESCRIPTION OF DRAWINGS

FIG. 16 is a block diagram showing the procedure according to a fourth embodiment of the present invention in which the surface shape data correction processing is applied to perform optical modeling.

FIGS. 17(a)–(b) are sectional views of a model having a hole of a diameter design value D=10.0 in the fourth embodiment of the present invention.

BEST MODE FOR CARRYING OUT THE INVENTION

Embodiments of the present invention will. be described hereunder with reference to the drawings.

Figure 1A:
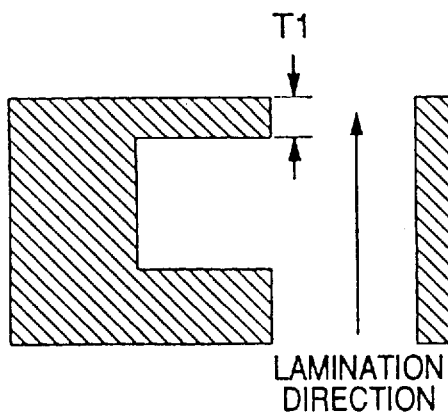
FIGS. 1(a)–1(c) model section views showing a first embodiment of the present invention.
Figure 1B:
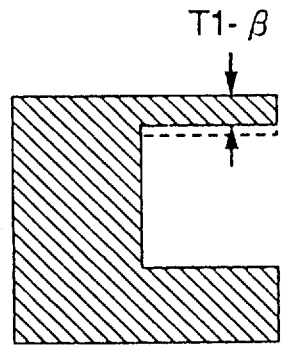
Figure 1C:
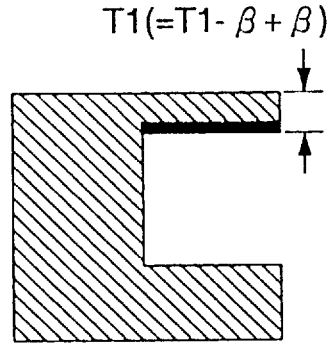

FIG. 1 is a model section view showing an embodiment of the present invention. FIG. 1(a) is a sectional view of a three-dimensional shape model prepared using a design value T1 of thickness of an overhang portion. FIG. 1(b) is a sectional view of a three-dimensional shape model in which thickness correction is applied by removing a superfluous curing thickness β determined from equation (1) from the design value T1 of the overhang portion. FIG. 1(c) is a sectional view of an optical modeling product which is modeled based on a corrected model. In this manner, through a method in which the three-dimensional shape model having the design value T1 of thickness of an overhang portion can be corrected and modeled to a three-dimensional shape model for modeling having a difference of subtraction of a superfluous curing thickness β of an overhang portion from the design value T1, the overhang portion of the corrected model has a thickness equalling the design value T1, thereby making it possible to obtain an optical modeling product of high dimensional accuracy.

Figure 2A:
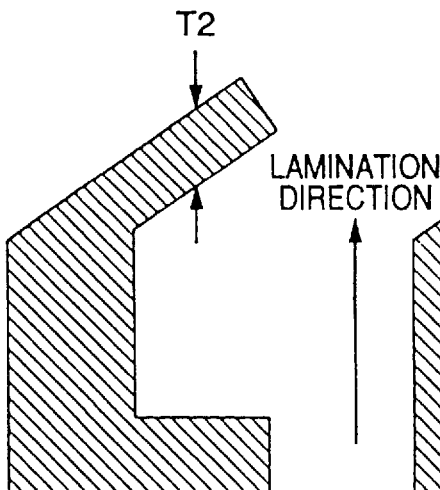
FIGS. 2(a)–2(c)are model section view in which an overhang portion is angled in the first embodiment of the present invention.
Figure 2B:
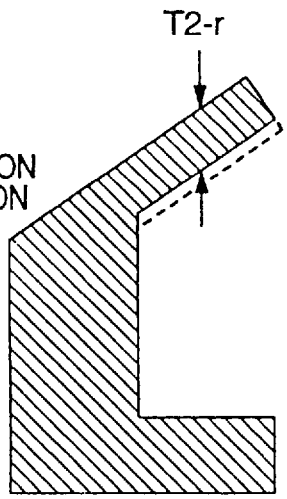
Figure 2C:
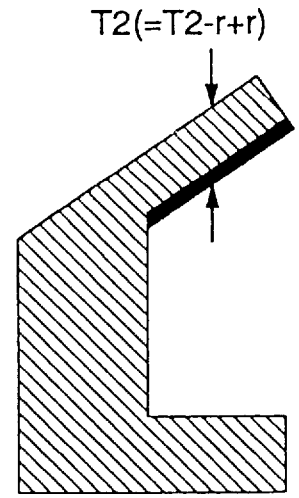

FIG. 2 is a model section view showing an embodiment of the present invention. FIG. 2(a) is a sectional view of a three-dimensional shape model prepared using a design value T2 of thickness of an overhang portion. FIG. 2(b) is a sectional view of a three-dimensional shape model in which thickness correction is applied by removing a superfluous curing thickness γ determined from equation (1) from the design value T2 of the overhang portion. FIG. 2(c) is a sectional view of an optical modeling product which is modeled based on a corrected model of FIG. 2(b). In this manner, even when the overhang portion is not vertical to the direction of lamination, equation (1) can be applied and an optical modeling product of high dimensional accuracy having the overhang portion of a thickness equal to the design value T2 can be obtained from a shape model in which the design value T2 is corrected for the superfluous curing thickness γ.

Figure 3:
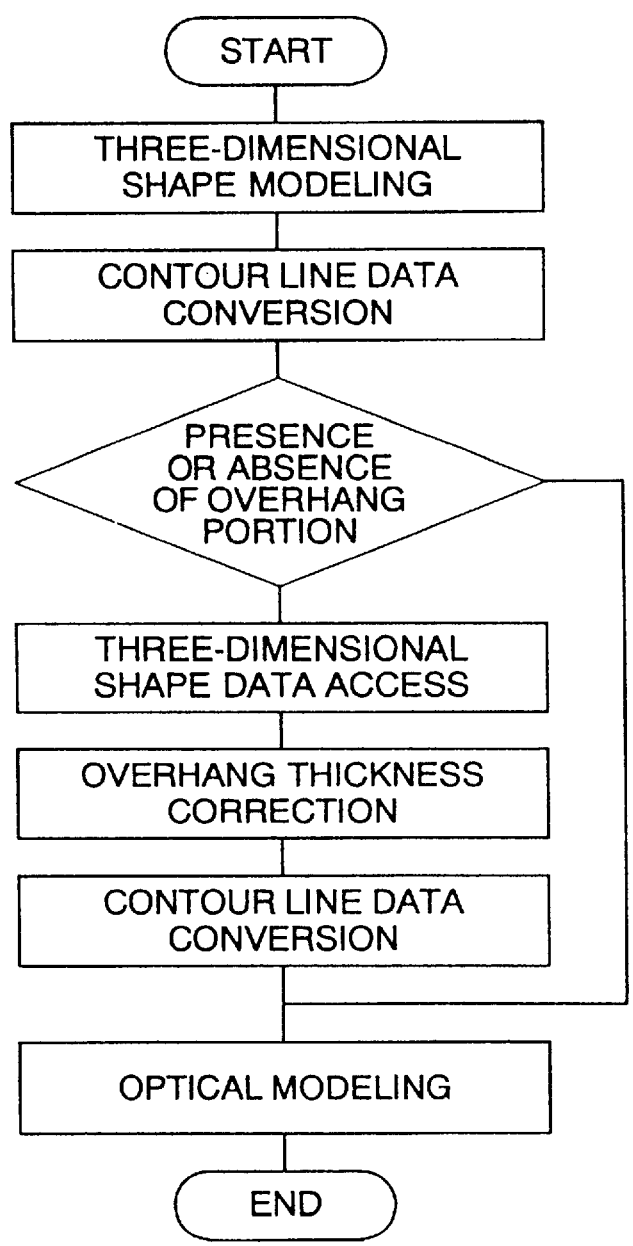
FIG. 3 is a flow chart showing a method of correcting a superfluous curing thickness in the first embodiment of the present invention.
Figure 4A:
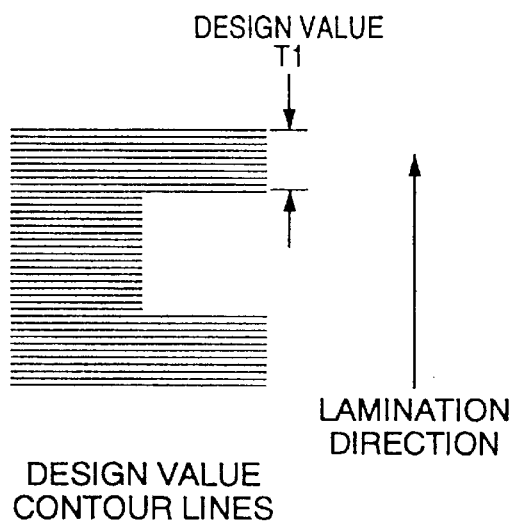
FIGS. 4(a)–4(d) model section and contour line data section diagram showing a second embodiment of the present invention.
Figure 4B:
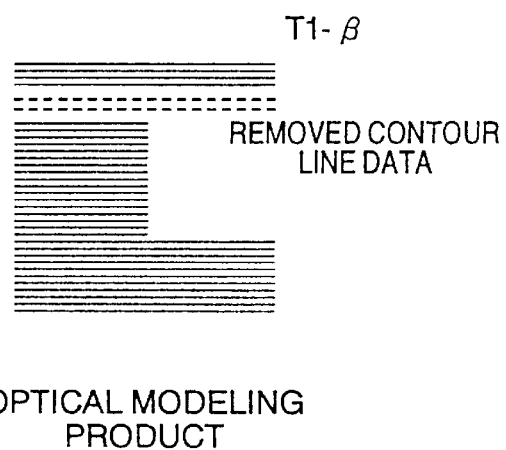
Figure 4C:
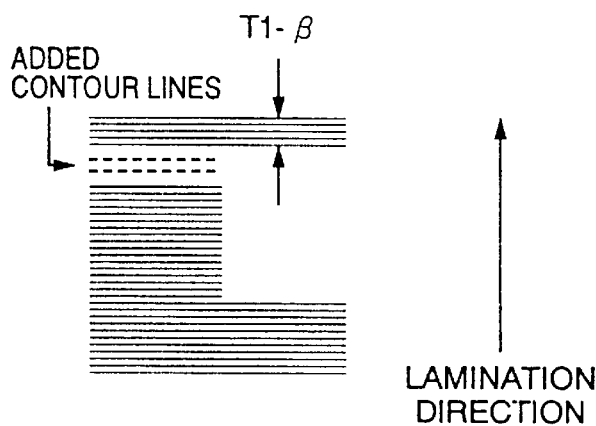
Figure 4D:
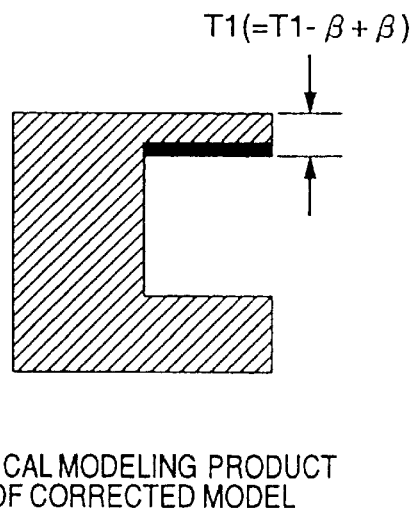

FIG. 3 is a flow chart for obtaining an optical modeling model of high dimensional accuracy by correcting the superfluous curing thickness of the overhang bottom in a three-dimensional shape model in accordance with the first embodiment of the present invention.

Firstly, a three-dimensional shape model is modeled in accordance with design values and contour line data conversion is carried out on the basis of the model data. The presence or absence of an overhang portion is decided from the vertical positional relation between individual contour lines. In the absence of any overhang portion, no superfluous curing thickness is involved and modeling, as it is, is proceeded with. With an overhang portion detected, a three-dimensional shape model inputted in accordance with the design values is accessed. A designed thickness of the overhang portion is substituted into equation (1) to obtain a superfluous curing thickness and a three-dimensional shape model is prepared in which the thickness of the overhang portion is corrected. The three-dimensional shape model having the superfluous curing thickness corrected is converted into contour line data and optical modeling is carried out using this contour line data.

FIG. 4 is a contour line and model section view showing a second embodiment of the present invention. FIG. 4(a) is a contour line and section diagram of a three-dimensional shape model prepared using a design value T1 of the thickness of an overhang portion. FIG. 4(b) is a contour line and section view in which a superfluous curing thickness β determined from equation (1) is removed from the design value T1 of the overhang portion. FIG. 4(c) is a contour line data section view in which removed data for a portion other than the overhang portion is added. FIG. 4(d) is a sectional view of an optical modeling product modeled based on a corrected model of FIG. 4(c).

Figure 5:
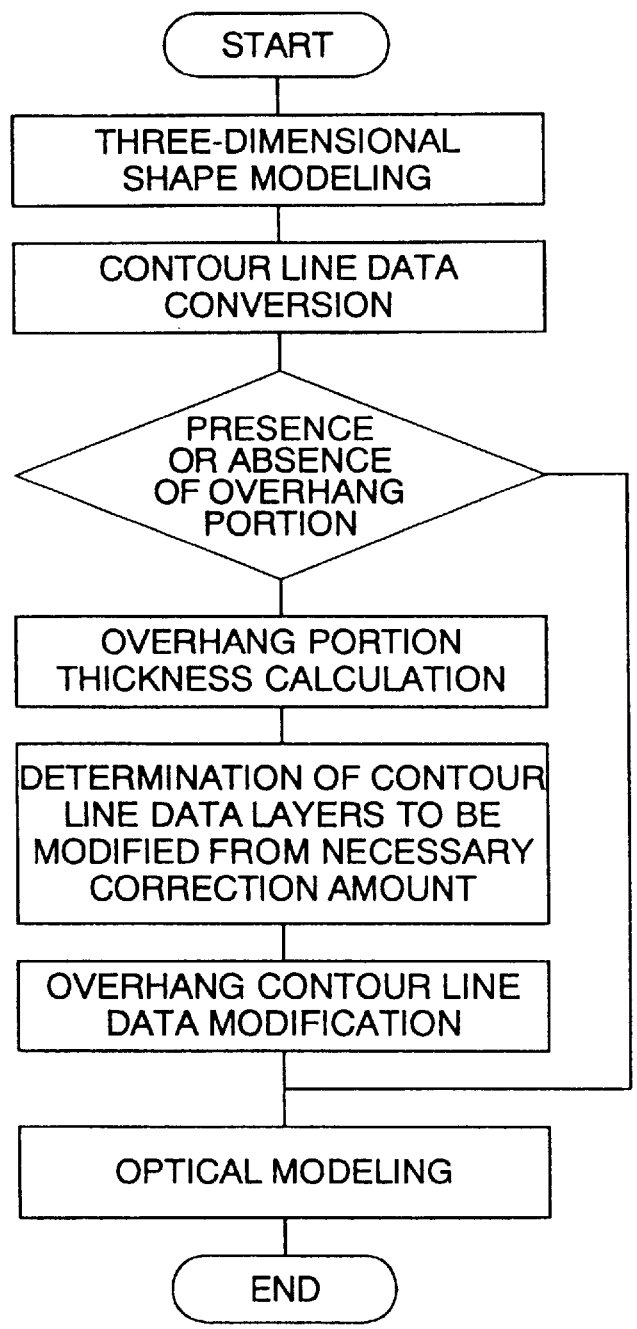
FIG. 5 is a flow chart showing a method of correcting a superfluous curing thickness in the second embodiment of the present invention.

FIG. 5 is a flow chart for a second embodiment directed to a method of correcting the superfluous curing thickness of an overhang portion by removing and adding model contour line data to obtain an optical modeling product of high dimensional accuracy and an apparatus based on the method.

Figure 6:
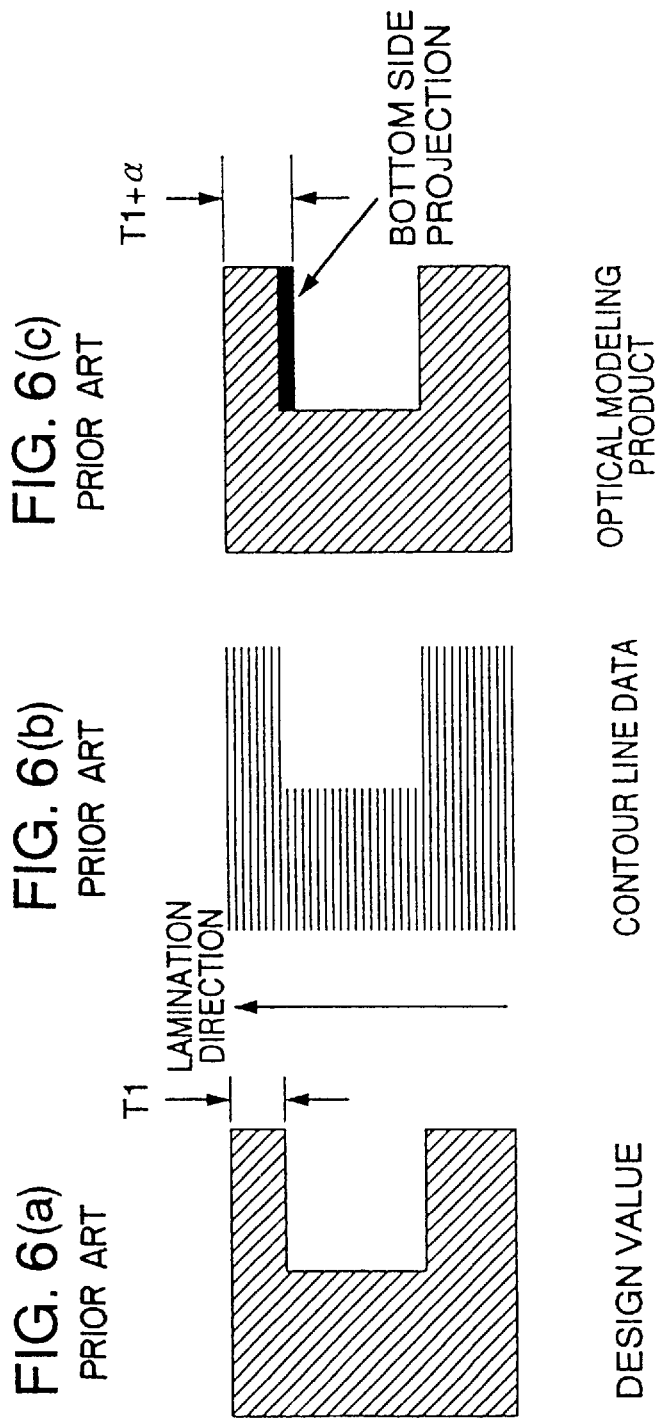
FIGS. 6(a)–6(c) is a sectional views showing a conventional example in which correction of a superfluous curing thickness is not made.

FIG. 6 shows a conventional example. When the design value of thickness of an overhang portion is set to T1 and the lamination direction is set as indicated by arrow, as shown at (a) in FIG. 6 and conversion into contour line data of a predetermined lamination pitch and optical modeling is performed as shown at (b), a laser beam for curing is irradiated in a direction inverse to the arrow (from the overhang top side) and consequently fresh resin, which is not desired fundamentally to be cured, is caused by a laser transmitting beam to suffer curing in a lower portion of the overhang, raising problems that superfluous curing takes place at the bottom of the overhang portion to cause the bottom to project and the thickness of the overhang portion amounts up to T1+α larger than the design value T1, as shown at (c), to degrade the dimensional accuracy.

Figure 7:
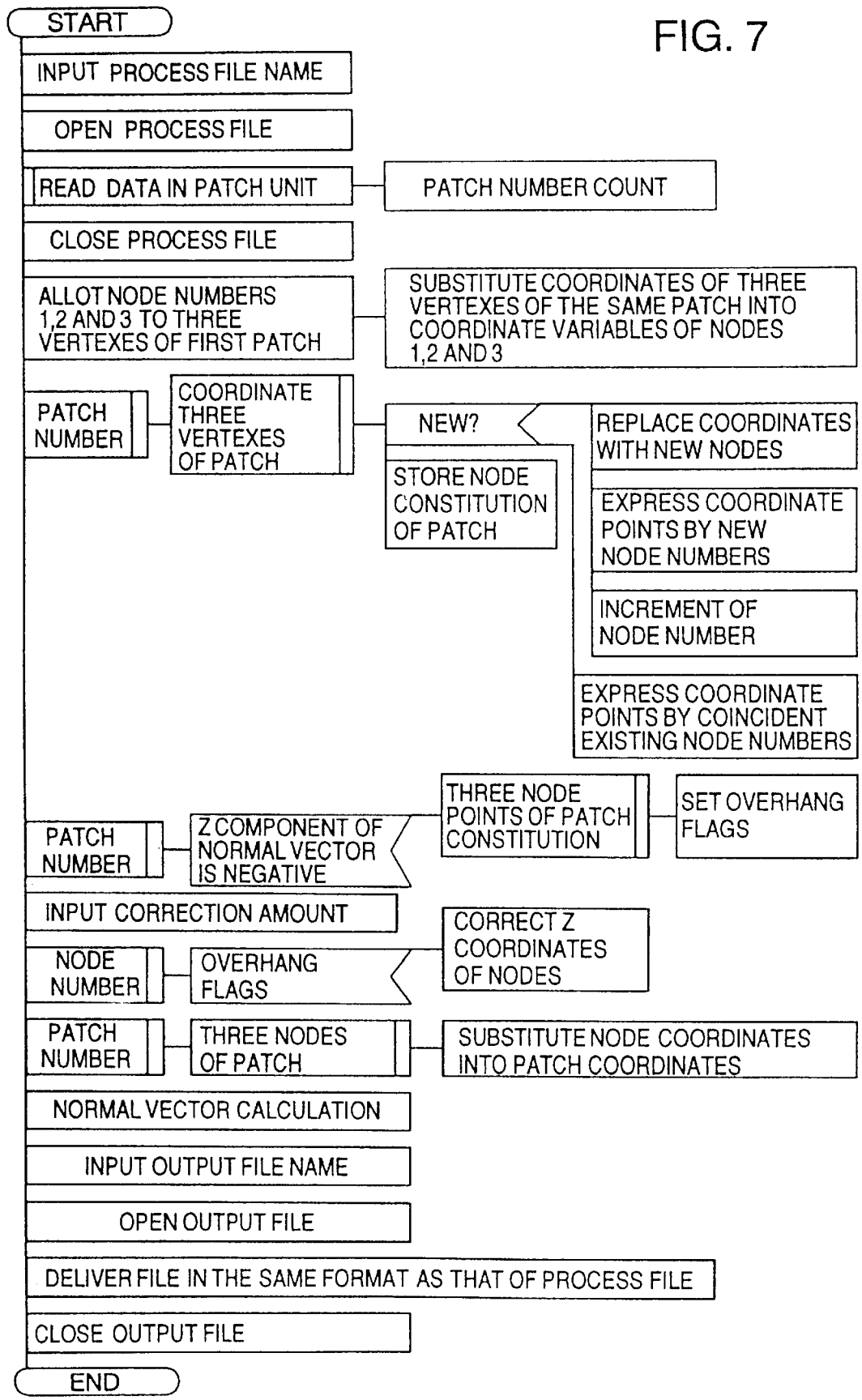
FIG. 7 is a PAD diagram of a processing method showing a third embodiment of the present invention in which a dimensional difference due to superfluous curing at the bottom of an overhang portion is corrected in a surface shape model.

FIG. 7 is a PAD diagram of a third embodiment of the present invention directed to a processing method of correcting a dimensional difference of the overhang portion bottom due to superfluous curing on surface shape data.

Figure 8:
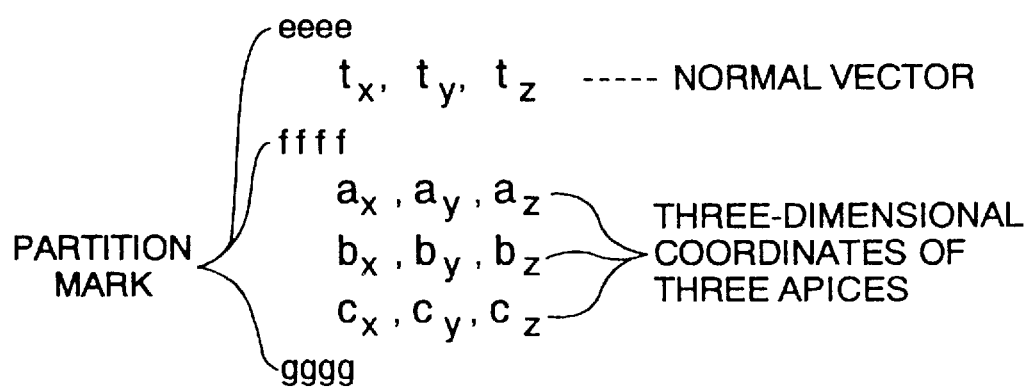
FIG. 8 is a format of surface shape data in the third embodiment of the present invention.

Firstly, a file of surface shape data to be corrected is designated. The surface shape data is data for expressing the surface of a three-dimensional shape model by a set of polygonal patches each having at least three vertexes, and triangular patches are described in connection with the present embodiment. Shown in FIG. 8 is a format of the surface shape data file. A normal vector and three-dimensional coordinates of three vertexes constituting individual patches are described and data pieces of the individual patches are separated from each other by terminator marks. Subsequently, coordinates of three vertexes and a normal vector of each patch in the surface shape data file are sequentially read and a total patch number is counted. Next, node numbers are allotted to the read-out coordinates of vertexes by allotting identical node numbers to the same coordinates of vertexes as those of patches previously read out. Further, information as to which nodes each patch is formed of is stored. Subsequently, for detection of an overhang portion, positive or negative of a Z component of a normal vector is decided. When the Z component is negative, that is, a patch plane faces downwards, the patch lies at the bottom of an overhang portion or the bottom of a modeling product and therefore, flags indicative of lying at the overhang portion bottom are attached to nodes constituting that patch. This procedure is repeated for all of the patches. Even when the above operation is effected on occasion while reading patch data, the processing as a whole is similar.

Next, a superfluous curing thickness α serving as a correction amount is set. The manner of determining the superfluous curing thickness α has been described in connection with the foregoing embodiments. Thereafter, flags of all nodes are examined and Z coordinates of nodes attached with flags are added with correction amounts so that coordinates of individual nodes may be replaced with new coordinate values which are Z coordinate values after correction. Coordinates of vertexes constituting a patch are rewritten with the replaced new coordinates of nodes. The plane inclination of the patch is now changed and hence a normal vector of the patch is calculated using the Z coordinates after correction. A new surface shape data file is prepared in the same format as the read-out data format from the coordinates of vertexes and the normal vector after correction.

Even when setting of correction amounts is effected at any phase before Z correction, the processing as a whole is similar.

Figure 9A:
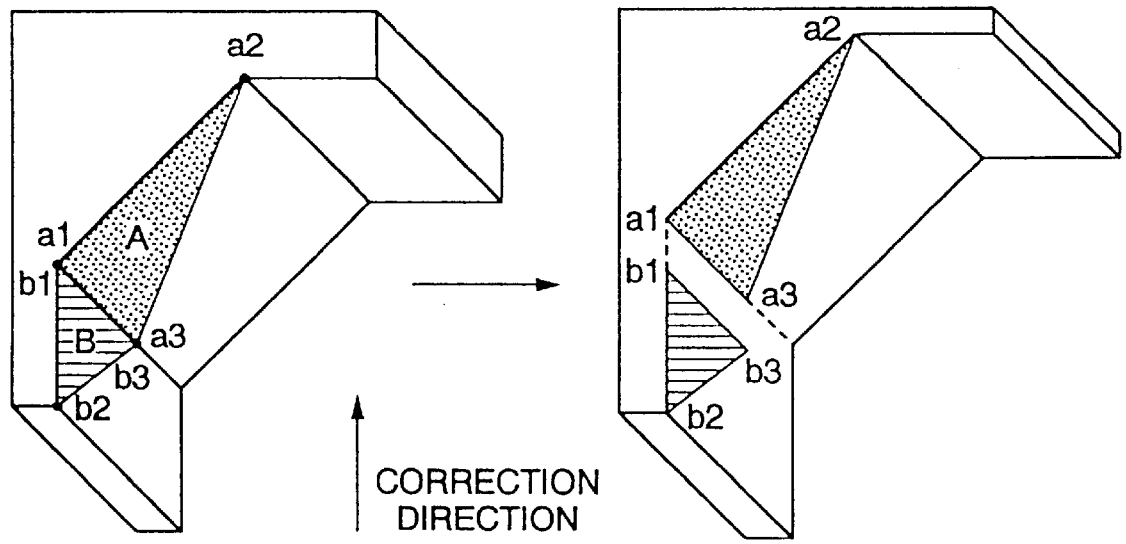
FIGS. 9(a)–(b) are perspective views showing the relation between triangular patches and nodes in the third embodiment of the present invention.
Figure 9B:
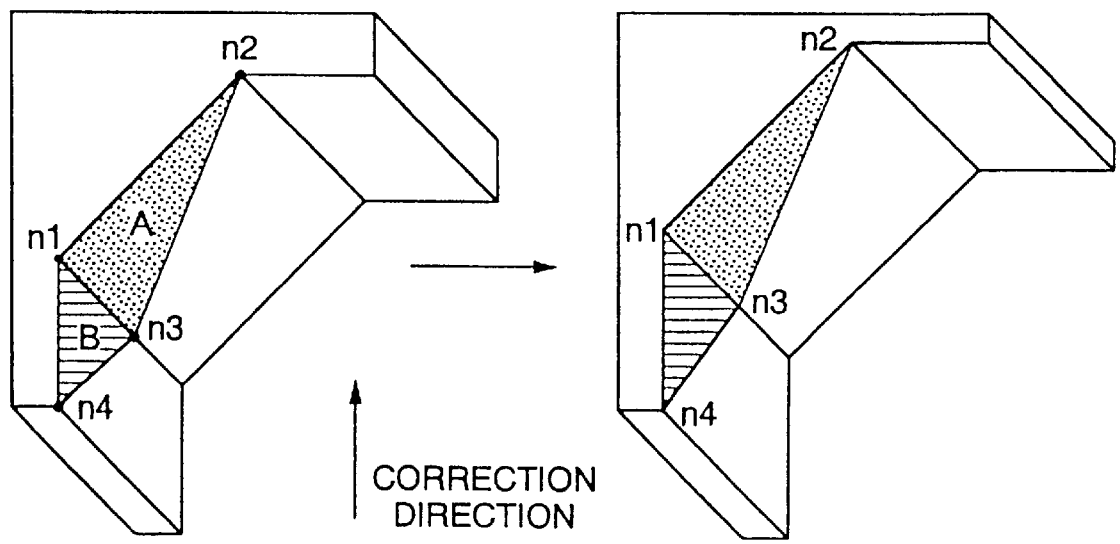

The reasons why node numbers are allotted to vertexes of patches and Z coordinate correction is processed at nodes will now be described. FIG. 9 is a diagram showing triangular patches of the surface shape data. FIG. 9(a) shows two adjacent patches A and B of which patch A lies at the bottom of an overhang portion and patch B is not at the overhang portion. The respective patches have vertexes a1, a2, a3 and b1, b2, b3. When coordinate values of the vertexes a1, a2 and a3 are moved upon changing of the shape of the patch A lying at the overhang portion bottom, the shape of the triangular patch A is changed while the patch A separating from the patch B to disturb the relation between the patches A and B, making data incorrect. A patch represented by normal surface shape data has at least three vertexes but is unaware of the fact that these. vertexes are in common to this patch and an adjacent patch. In FIG. 9(b), apices in common to the triangular patches A and B are replaced with nodes n1 and n3 and the shape of the patch A is changed by moving nodes n1, n2 and n3.

As a result, the shape of the patch B is concurrently changed so that the patches A and B may not separate from each other and the relation therebetween may be held to make data correct. Thus, in triangular patches representing the surface of a model, by replacing apices in common to adjacent patches with nodes and moving the nodes, the shape and position of both the patches can be changed without causing the two patches to separate from each other and intersect with each other. The inclined overhang bottom is exemplified herein but a horizontal one may be handled similarly.

Figure 10:
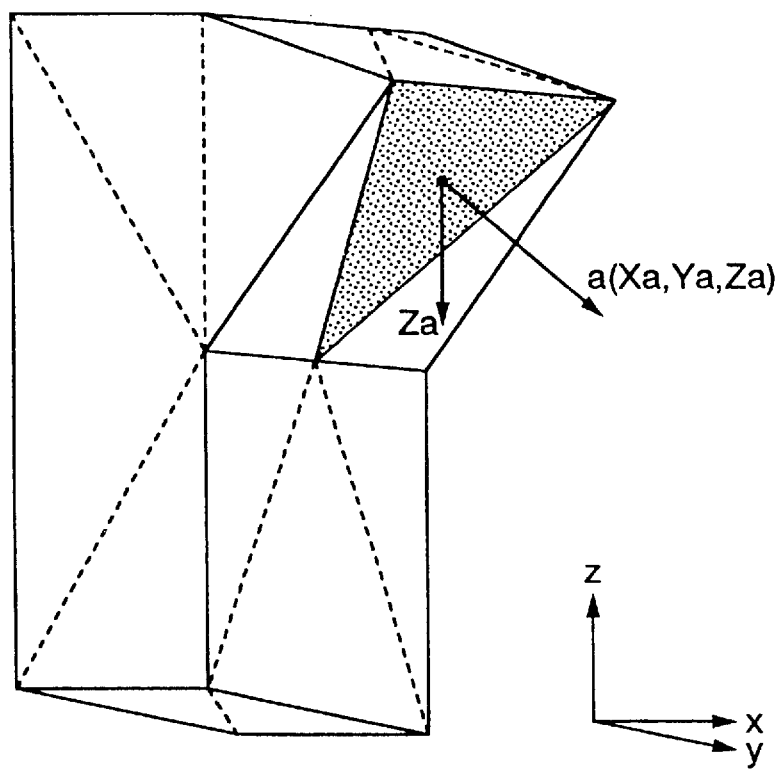
FIG. 10 is a perspective view showing a normal vector of a patch at an overhang portion in the third embodiment of the present invention.

Next, a method of deciding a patch lying at the bottom of a modeling product or the bottom of an overhang portion by using a normal vector will be described. Shown in FIG. 10 are a triangular patch lying at the bottom of an overhang portion and its normal vector. Given that the direction of lamination of the model coincides with the positive direction of coordinate z axis and a normal vector vertical to a plane defined by the patch and directing outwardly of the model is a (Xa, Ya, Za), that patch faces downwards when for the Z component, Za<0 stands and is determined to lie at the overhang portion bottom. By deciding positive or negative of the normal vector Z component in this manner, the patch lying at the overhang portion bottom can be detected automatically.

Through the above processing method, the modeling product bottom and overhang portion bottom can be detected automatically, the dimensional difference can be corrected efficiently on surface shape data and an optical modeling product of high dimensional accuracy can be obtained by performing modeling on the basis of the data.

While in the present embodiment the triangular patch has been described, a polygonal patch may be handled similarly.

Figure 11A:
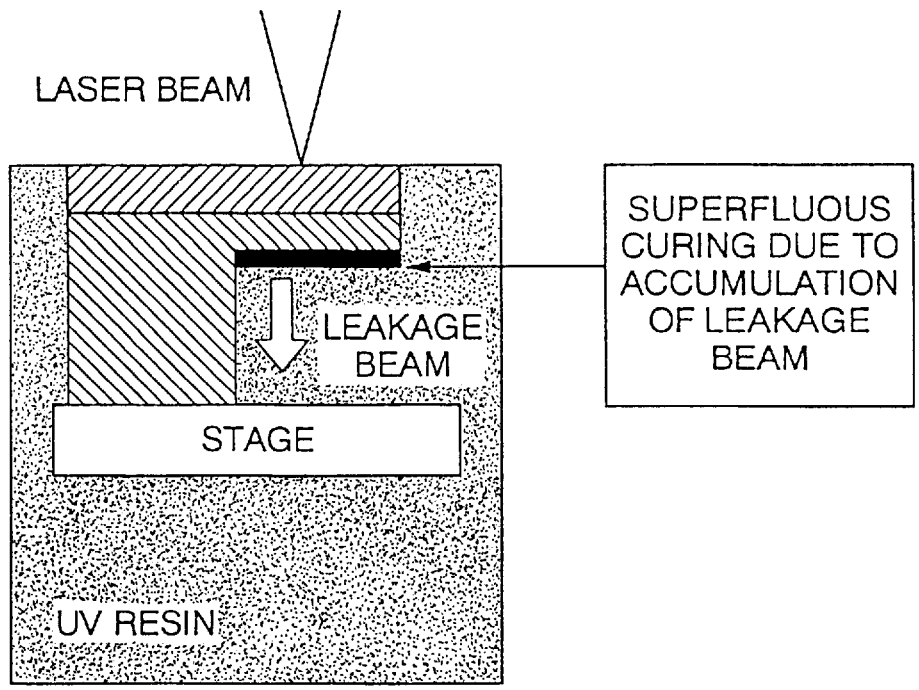
FIGS. 11(a)–(b) are sectional views for explaining a superfluous curing thickness in the third embodiment of the present invention.
Figure 11B:
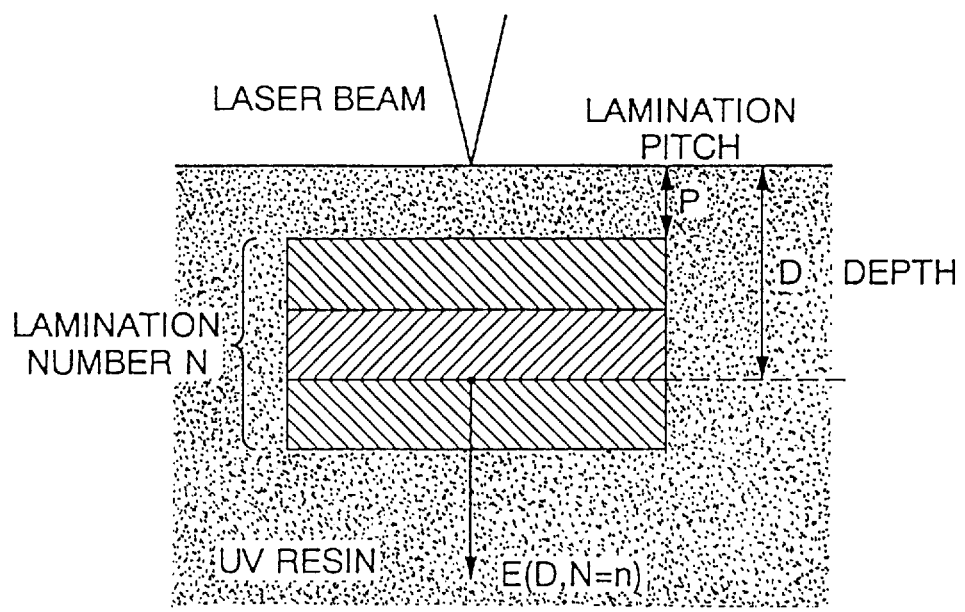

A description will now be given of the superfluous curing thickness. FIG. 11(a) shows the principle of superfluous curing in optical modeling. Superfluous curing is caused by a phenomenon that a leakage of a laser beam transmitting through the overhang portion of a model cures fresh resin at the bottom of overhang portion. FIG. 11(b) is a diagram for explaining how to determine a superfluous curing thickness α.

Figure 12:
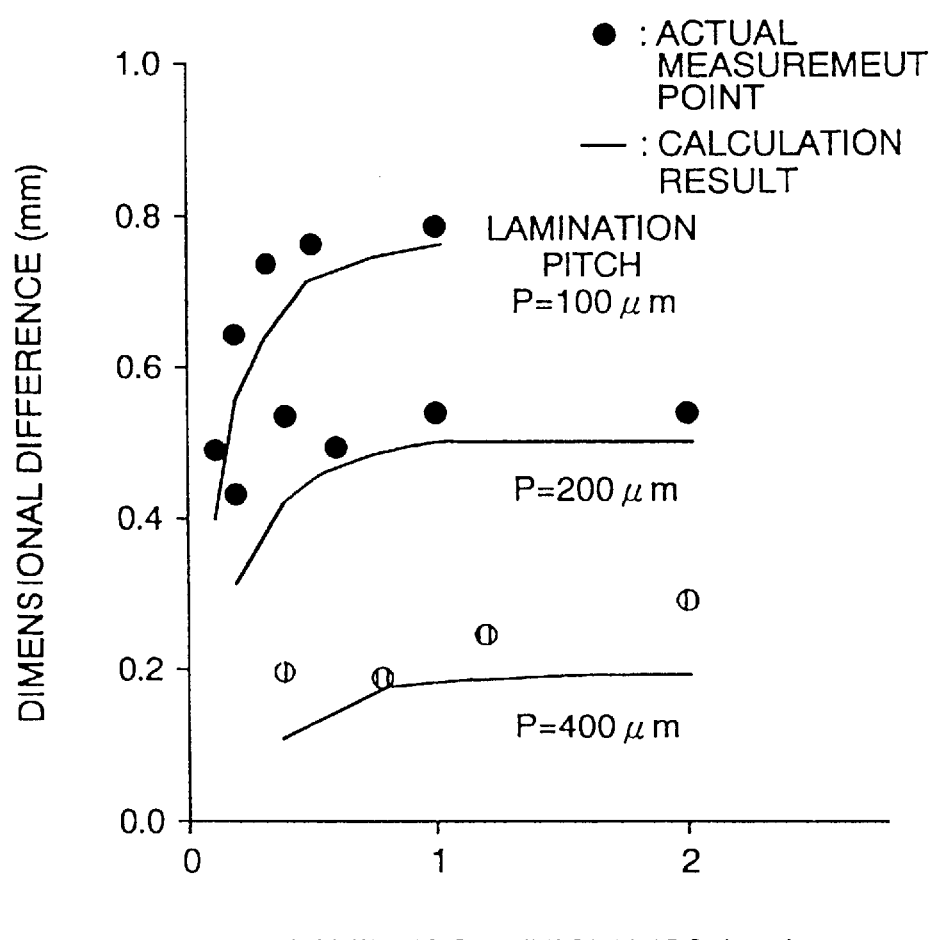
FIG. 12 is a graph for explaining the relation between lamination thickness and dimensional difference in the third embodiment of the present invention.

FIG. 12 shows the relation between lamination thickness and dimensional difference. The data is indicative of results obtained with the bottom of a horizontal overhang portion. As is clear from the figure, results of calculation of α=D−P(n−1) fairly coincide with actual measurement values.

Figure 13:
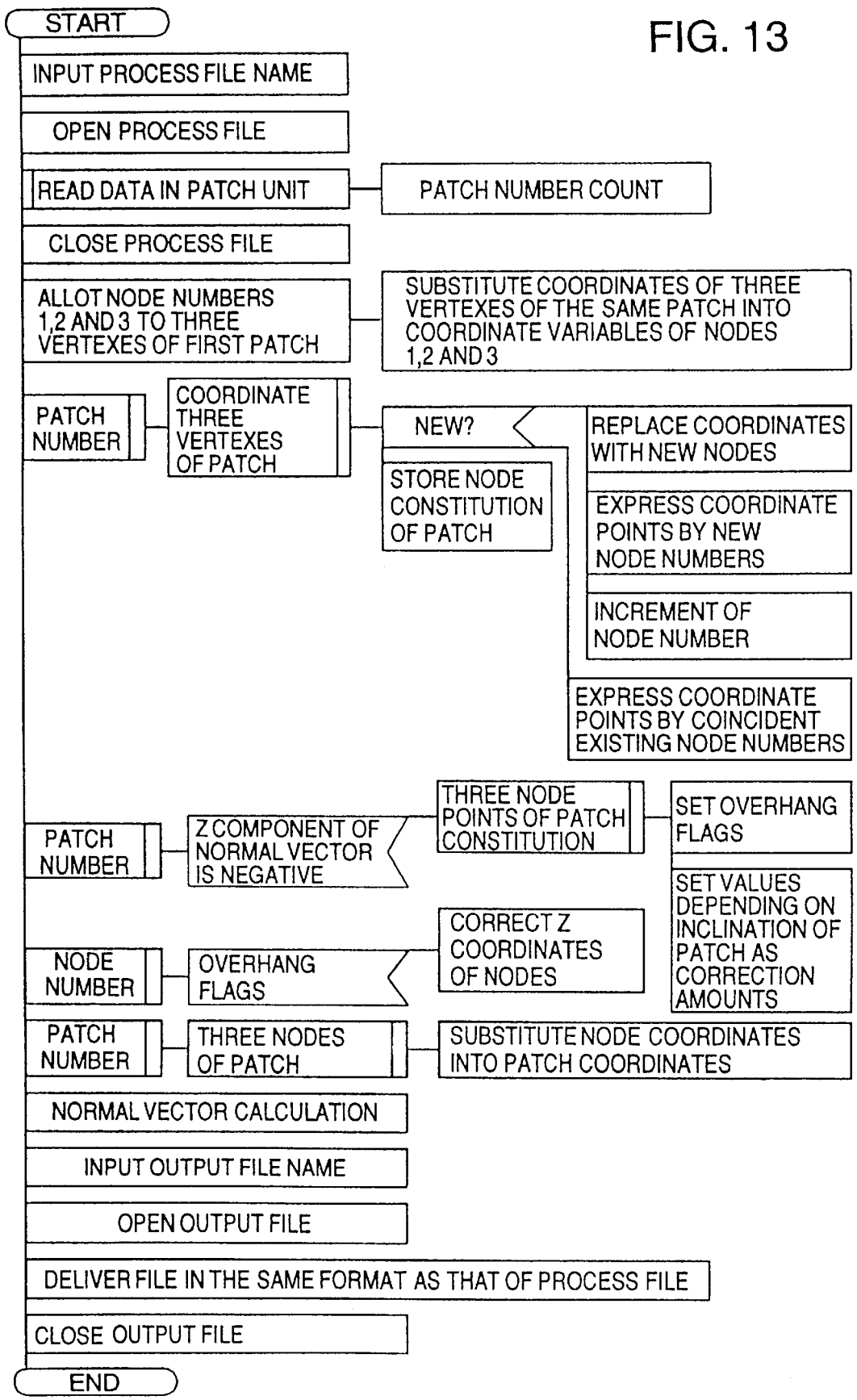
FIG. 13 is a PAD diagram when the correction amount takes a value which depends on an inclination of the overhang portion bottom in the third embodiment of the present invention.
Figure 14A:
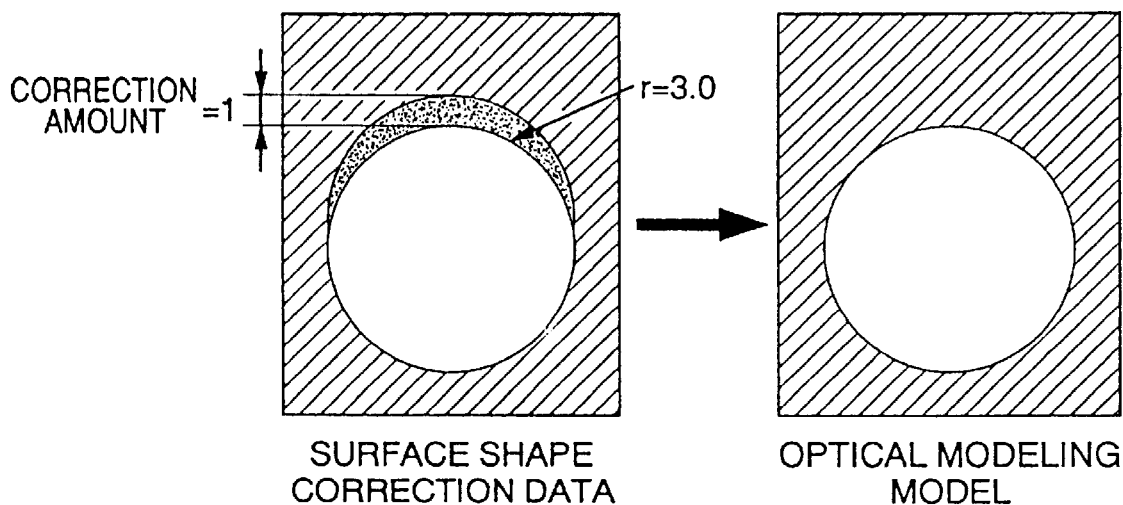
FIGS. 14(a)–(b) are sectional views of a model when the correction amount takes a value which depends on an inclination of the overhang portion bottom in the third embodiment of the present invention.
Figure 14B:
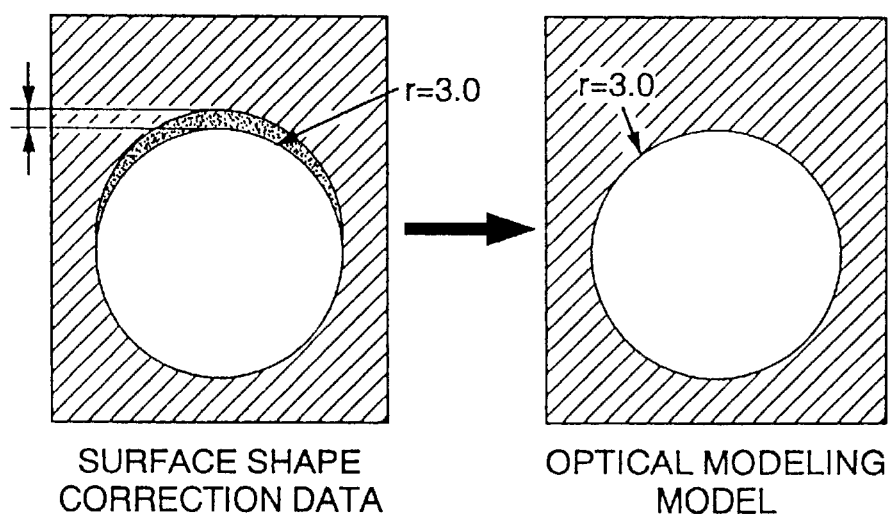

FIG. 13 is a PAD diagram for the case where the correction amount is a value which depends on an inclination of the overhang portion bottom in the third embodiment of the present invention. After a patch lying at the bottom of an overhang portion is detected, values depending on an inclination of the patch are set, as correction amounts, to nodes constituting that patch. FIG. 14(a) is a section view of model data obtained by applying the above correction of a correction amount of 1 to surface shape data of a model having a hole of a radius r of 3.0. However, the superfluous curing thickness depends on the inclination of the overhang portion bottom and therefore, when optical modeling is carried out based on this data, the dimensional difference becomes irregular and an optical modeling model deformed as shown in right section results. FIG. 14(b) is a section view of model data obtained by applying the above correction of a correction amount which depends on the inclination of the overhang portion bottom, and when optical modeling is effected based on this data, a smooth hole shape as shown in the figure can be prepared and an optical modeling model of high dimensional accuracy can be obtained.

Even when setting of the correction amounts is effected at any phase after the patch lying at the overhang portion bottom is detected, the processing as a whole is similar.

By applying correction to the surface shape data through the above process method and performing modeling, an optical modeling product of high dimensional accuracy can be obtained.

Figure 15:
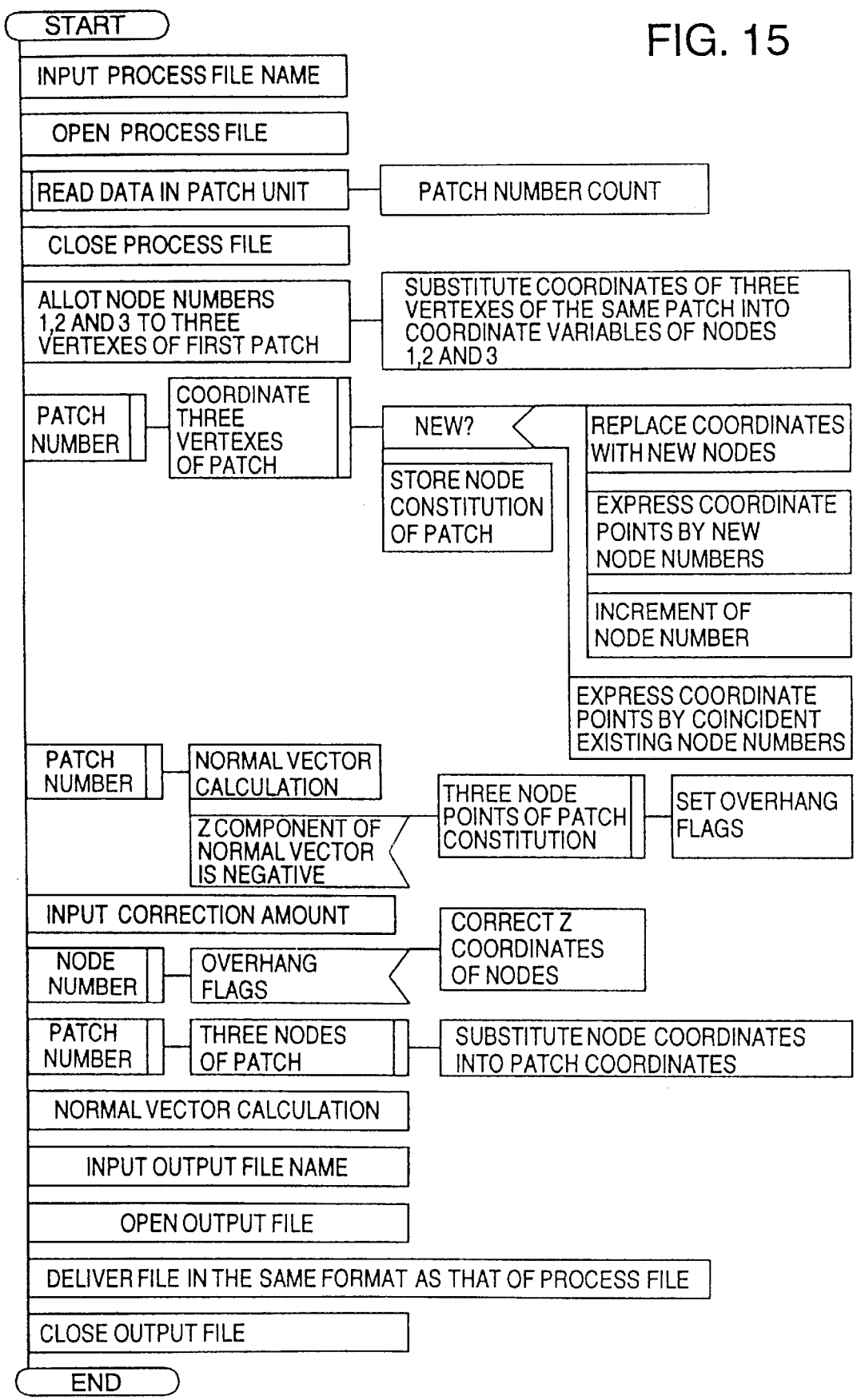
FIG. 15 is a PAD diagram when a normal vector is calculated from apices of a polygonal patch in the third embodiment of the present invention.

FIG. 15 is a PAD diagram for the case where normal vectors are calculated from vertexes of polygonal patches in the third embodiment of the present invention. Coordinates of vertexes constituting triangular patches included in the surface shape data file are read and normal vectors of the patches are calculated from the coordinates of vertexes. A patch lying at an overhang portion is decided using its normal vector. Even when calculation of the normal vector is effected at any phase before positive or negative of its Z component is determined, the processing as a whole is similar.

By applying correction to the surface shape data through the above process method and performing modeling, an optical modeling product of high dimensional accuracy can be obtained.

FIG. 16 shows a fourth embodiment of the present invention directed to the procedure for performing optical modeling by applying the correction processing to the above-described surface shape data. A shape model is prepared by three-dimensional CAD, the shape model is converted into surface shape data for optical modeling, the data is subjected to automatic detection of an overhang portion and applied with the correction processing of dimensional difference automatic correction, and optical modeling is carried out. FIG. 17 is a sectional view of a model formed with a hole having a diameter of design value D=10.0, especially, FIG. 17(a) being a section view of a model modeled without correction and FIG. 17(b) being a section view of a model applied with the aforementioned correction processing. Thus, by performing modeling in accordance with the procedure of the present invention, an optical modeling product of high dimensional accuracy can be obtained.

Figure 18:
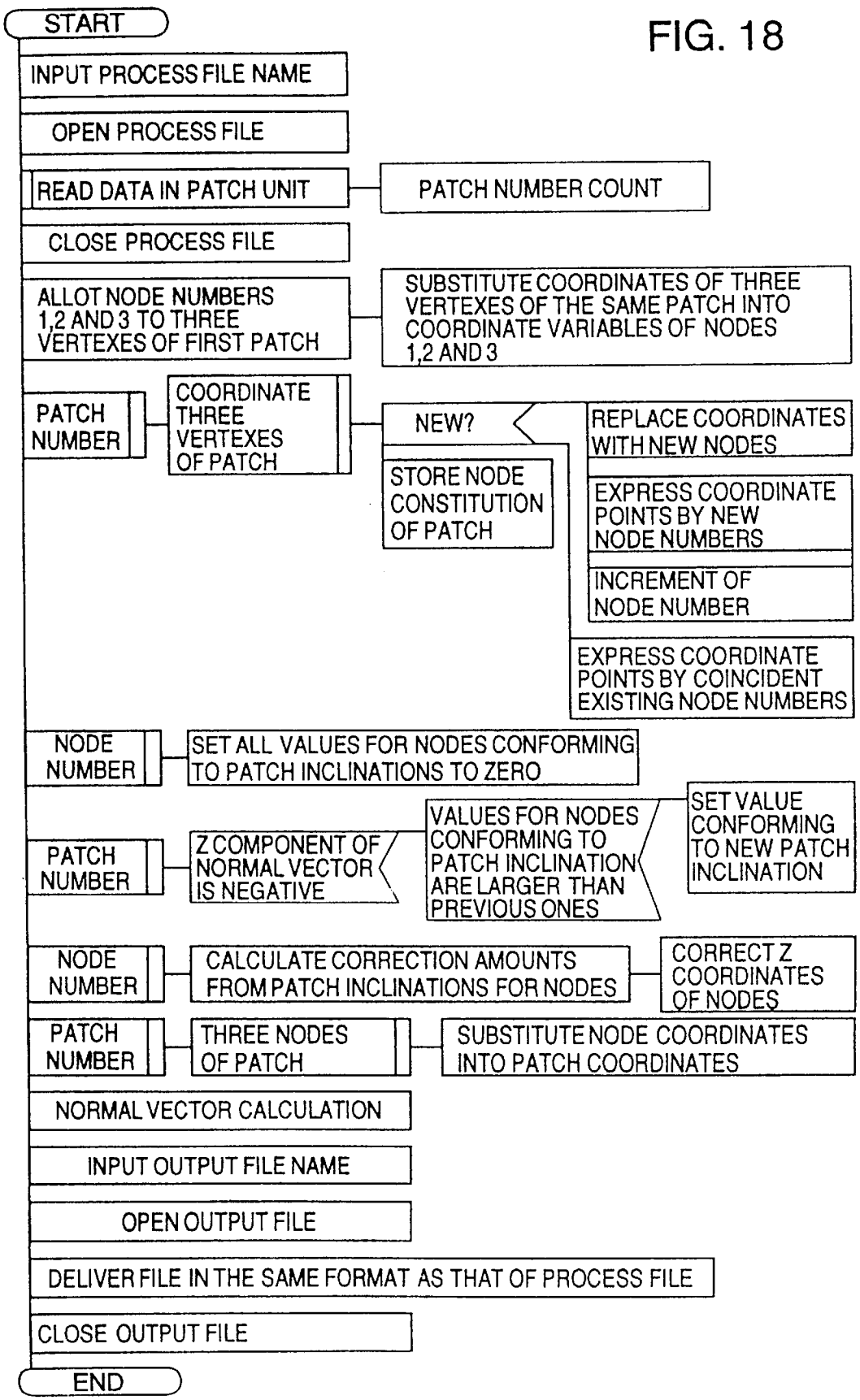
FIG. 18 is a PAD diagram showing a processing method according to a fifth embodiment of the present invention in which correction is effected by a surface shape model.

FIG. 18 is a PAD diagram of a fifth embodiment of the present invention in which the dimensional difference of the overhang portion bottom or model bottom due to superfluous curing is eliminated by correcting surface shape data with a value determined by a predetermined rule in accordance with one of inclinations of adjacent overhang portion bottoms, especially, a maximum inclination with respect to the modeling direction axis herein.

Figure 19A:
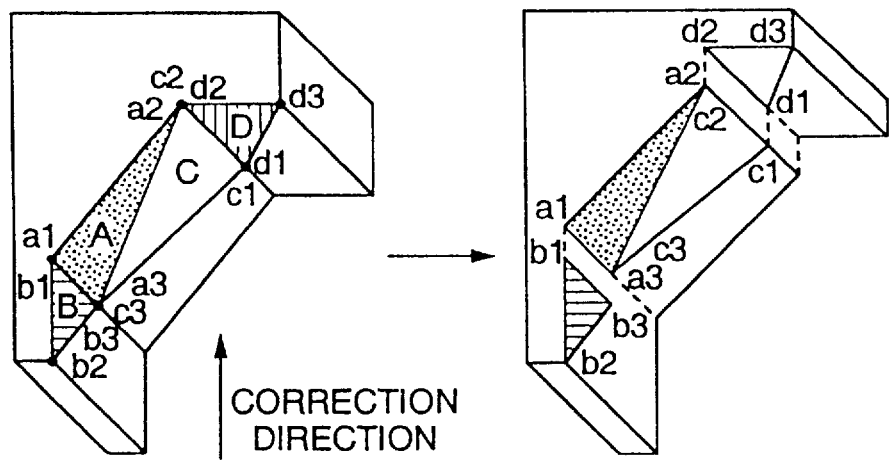
FIGS. 19(a)–(c) are perspective views showing the relation between triangular patches and nodes in the fifth embodiment of the present invention.
Figure 19B:
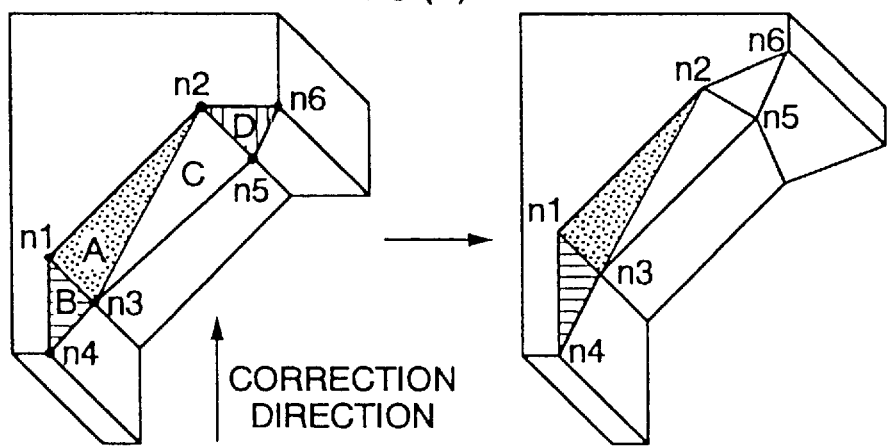

The reasons why node numbers are allotted to vertexes of patches and Z coordinate correction is processed at nodes will now be described. FIG. 19 is a diagram showing triangular patches of the surface shape data. FIG. 19(a) shows two adjacent patches A, B and C, D of which patch A lies at the bottom of an overhang portion and patch B is not at the overhang portion. The respective patches have vertexes a1, a2, a3 and b1, b2, b3. When coordinate values of the vertexes a1, a2 and a3 are moved upon changing of the shape of the patch A lying at the overhang portion bottom, the shape of the triangular patch A is changed while the patch A separating from the patch B to disturb the relation between the patches A and B, making data incorrect. A patch represented by normal surface shape data has at least three vertexes but is unaware of the fact that these apices are in common to this patch and an adjacent patch. In FIG. 19(b), vertexes in common to the triangular patches A and B are replaced with nodes n1 and n3 and the shape of the patch A is changed by moving nodes n1, n2 and n3. As a result, the shape of the patch B is concurrently changed so that the patches A and B may not separate from each other and the relation therebetween may be held to make data correct. Thus, in triangular patches representing the surface of a model, by replacing vertexes in common to adjacent patches with nodes and moving the nodes, the position can be changed without causing the two patches to separate from each other and intersect with each other. The inclined overhang bottom is exemplified herein but a horizontal one may be handled similarly.

Figure 19C:
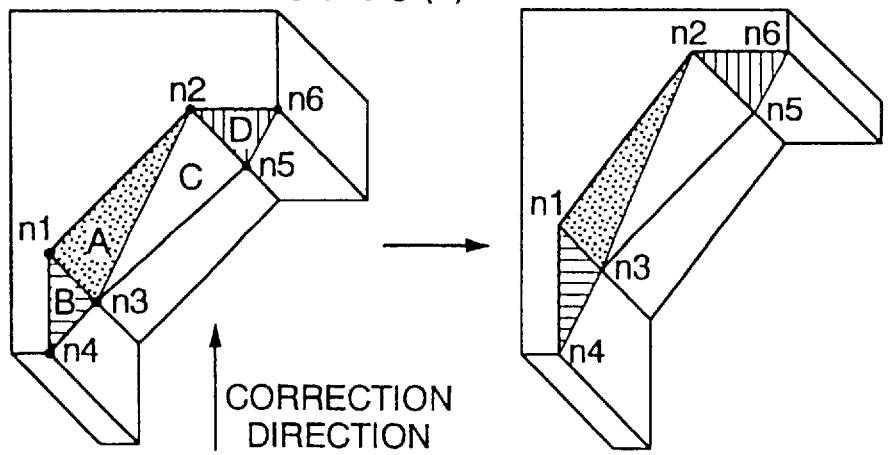

Next, the reasons why values applied to nodes common to patches are set to a value corresponding to one of inclination values of the patches which is the largest will be described. Given that values conforming to patch inclinations are β,β and γ (β<γ) for each patch in patches A, C and D processing, and node n2 and n5 are in same hight. In case when the correcting process is carried out in order of patches C, D and A, as node n2 is common to patches C, D and A, value applied to node n2 which conform to patch inclinations is β at patch C processing, γ at patch D processing and β at patch A processing, and also as node n5 is common to patches C and D, value applied to node n5 is β at patch C processing, γ at patch D processing. Last value of node n2 is β, and last value of node n5 is γ. Correcting amount of node n2 is smaller than that of node n5, as β and γ are in relation β<γ. Correcting process is in result that z coordinate value (i.e. hight) of node n2 differs from that of n5 and the patch D is adversely affected so as to be inclined as shown in FIG. 19(b). FIG. 19(c) shows an example where values applied to common nodes n2 and n5 and conforming to inclinations are set to a maximum value. Even when the patch processing is carried out in different order of A, C and D or C, D and A, values applied to nodes n2 and n5 at the same height and conforming to patch inclinations are both set to γ, so that Z coordinate values of nodes n2 and n5 after correction are at the same height and disturbance of the shape can be avoided.

Through the processing method as above, bottom of model and the overhang portion bottom can be detected automatically and the dimensional difference can be corrected efficiently on surface shape data, thereby ensuring that an optical modeling product of high dimensional accuracy can be obtained by performing modeling on the basis of the data.

While in the present embodiment the triangular patch has been described, a polygonal patch may be handled similarly.

As described above, according to the present invention, by calculating a superfluous curing thickness caused by repetitious laser irradiation and performing correction by the thickness amount on three-dimensional model data or contour line data, an optical modeling product which exhibits high dimensional accuracy in the direction of lamination can be obtained to advantage.

Further, the bottom of a modeling product and the bottom of an overhang portion can be detected automatically and a dimensional difference which is inherent to optical modeling technique and which is caused at the bottom can be corrected on surface shape data, so that correction of dimensional difference need not be subjected to further manual modification after returning to the three-dimensional CAD and the processing can advantageously be completed automatically within a short period of time.

We claim:

1. An optical modeling method of preparing an optical modeling model comprising the steps of:

curing ultraviolet-ray curable resin under irradiation of a laser beam thereon;

laminating cured resin; and correcting in advance, on three-dimensional shape data or contour line data for lamination, a superfluous curing thickness caused by a phenomenon that a leakage of a laser beam transmitting through the bottom of an overhang portion of a modeling product cures fresh resin at the overhang portion bottom.

2. An optical modeling method according to claim 1, wherein the step of correcting a superfluous curing thickness includes the steps of:

detecting the overhang portion and its thickness from shape data of a three-dimensional shape models and effecting correction using a predetermined value complying with the thickness.

3. An optical modeling method of preparing an optical modeling model comprising the steps of:

curing ultraviolet-ray curable resin under irradiation of a laser beam thereon;

laminating cured resin;

correcting in advance, on three-dimensional shape data or contour line data for lamination, a superfluous curing thickness caused by a phenomenon that a leakage of a laser beam transmitting through the bottom of an overhang portion of a modeling product cures fresh resin at the overhang portion bottom; and detecting the overhang portion and its thickness from shape data of a three-dimensional shape model;

calculating, given that the number of laminated layers of the modeling product at the overhang portion is N, a lamination pitch is P, a light absorption coefficient of the resin is k, a wavelength of a curing beam is $\lambda$, and the ratio of a critical energy of resin curing to an irradiation energy of the curing beam is Eo, a superfluous curing thickness $\alpha$ constituting a correction value for correction effected using a predetermined value complying with the detected thickness for pre-correction of superfluous curing as follows:

$$\alpha = -\lambda/k(ln(Eo) - ln(C)) - P$$

where $$C = (1 - B^N)/(1 - B)$$

$$B = EXP(-kP/\lambda); \text{ and}$$

removing and adding shape data corresponding to the superfluous curing correction data.

4. A data processing method comprising the steps of:

using surface shape data representing the surface of a three-dimensional shape model by a set of polygonal patches each having at least three vertexes for modeling a three-dimensional shape model;

deciding whether each patch lies at the bottom of a modeling product or the bottom of an overhang portion of the modeling product based on the direction of a normal vector of a patch plane; and when said patch is decided to lie at said bottom, moving coordinates of vertexes constituting said patch in a predetermined direction by a predetermined amount.

5. An optical modeling method according to claim 1, further comprising the step of correcting surface shape model data;

wherein the step of correcting surface shape model data includes the steps of:

replacing vertexes of patches with nodes;

deciding whether a polygonal patch lies at the bottom of the modeling product or the overhang portion bottom based on whether a Z component of a normal vector of said patch is positive or negative;

attaching flags indicating that said patch lies at the overhang portion bottom to nodes constituting said patch when the Z component is negative to indicate that said patch lies at the overhang portion bottom;

examining all nodes enable correction to be applied to Z coordinate values of nodes having flags attached thereto; and correcting the shape and position of all polygonal patches having said nodes as vertexes.

6. An optical modeling method according to claim 1 or 2, further comprising the step of applying a correction amount to Z coordinate values of nodes constituting a polygonal patch lying at the bottom of the modeling product or the overhang portion bottom depending on an inclination of the overhang portion bottom.

7. An optical modeling method according to claim 1, 2, or 3, further comprising the steps of:

calculating a normal vector vertical to a plane defined by a polygonal patch and directed outwardly from a model from coordinates of vertexes constituting said polygonal patch; and deciding whether said polygonal patch lies at the overhang portion bottom based on whether the normal vector is positive or negative.

8. A data processing method in which surface shape data representing the surface of a three-dimensional shape model by a set of polygonal patches each having at least three vertexes is used for modeling a cubic shape model, the method comprising the steps of:

correcting surface shape model data through a processing method in which vertexes of patches are put in order so as to be replaced with nodes;

deciding whether a polygonal patch lies at the bottom of a modeling product or the bottom of an overhang portion of the modeling product based on whether a Z component of a normal vector of said patch is positive or negative;

attaching flags indicating that said patch lies at the overhang portion bottom to nodes constituting said patch when the Z component is negative to indicate that said patch lies at the overhang portion bottom;

examining all nodes to enable correction to be applied to Z coordinate values of nodes having flags attached thereto;

when changing the shape and position of all polygonal patches having said nodes as vertexes, setting correction amounts applied to Z coordinate values of said nodes to predetermined values in accordance with inclinations of said patches; and effecting correction by a maximum correction amount conforming to a maximum value of inclinations of some overhang portion bottom patches having said nodes in common, or returning said nodes to coordinates of the respective vertexes to recover said patches to enable them to be expressed by coordinates.

9. An optical modeling apparatus comprising:

means for calculating, given that the number of laminated layers of a modeling product at an overhang portion is N, a lamination pitch is P a light absorption coefficient of a resin is k, a wavelength of a curing beam is $\lambda$, and the ratio of a critical energy of resin curing to an irradiation energy of the curing beam is Eo, a superfluous curing thickness $\alpha$ for pre-correction of superfluous curing as follows:

$$\alpha = -\lambda/k(ln(Eo) - ln(C)) - P$$

where $$C = (1-B^N)/(1-B)$$

$$B = EXP(-kP/\lambda); \text{ and}$$

means for decreasing the lamination thickness of the overhang portion bottom and the lamination thickness of that portion by a to pre-correct the dimension to thereby prepare a shape.

10. A data processing method in an optical modeling method or apparatus for preparing an optical model by curing ultraviolet-ray curable resin under irradiation of a laser beam thereon and laminating cured resin, the data processing method comprising the step of:

performing pre-correction of surface shape model data according to the data processing method recited in claim 8.

* * * * *